United States Patent [19]
Tsuruta

[11] Patent Number: 6,160,815
[45] Date of Patent: Dec. 12, 2000

[54] BAND SETTING APPARATUS FOR SUPPRESSING CELL DELAY VARIATION

[75] Inventor: Atsuo Tsuruta, Tokyo, Japan

[73] Assignee: NEC Corporation, Tokyo, Japan

[21] Appl. No.: 09/213,157

[22] Filed: Dec. 17, 1998

[30] Foreign Application Priority Data

Dec. 24, 1997 [JP] Japan ................................. 9-355630

[51] Int. Cl.[7] ................................................. H04J 3/16
[52] U.S. Cl. ......................... 370/442; 370/412; 370/429
[58] Field of Search .................................... 370/442, 444, 370/395, 407, 412, 413, 414, 415, 416, 429, 452, 458, 460, 461, 252, 256, 253, 468, 408

[56] References Cited

U.S. PATENT DOCUMENTS

| 5,572,518 | 11/1996 | Takama et al. | 370/385 |
| 5,610,918 | 3/1997 | Kamo et al. | 370/395 |
| 5,680,396 | 10/1997 | Moritomo et al. | 370/392 |

FOREIGN PATENT DOCUMENTS

| 4-154327 | 5/1992 | Japan . |
| 5-292108 | 11/1993 | Japan . |
| 8-204729 | 8/1996 | Japan . |
| 10-65697 | 3/1998 | Japan . |
| 10-93607 | 4/1998 | Japan . |
| 10-262074 | 9/1998 | Japan . |
| 10-336186 | 12/1998 | Japan . |
| 2 310 119 | 8/1997 | United Kingdom . |

OTHER PUBLICATIONS

"Apportionment of Upstream Bandwidth for ATM–PDS System", Proceedings of the 1996 IEICE Communication Society Conference, B838, 1996.

European Search Report dated Feb. 23, 1999.

Tim Finegan; International Telecommunication Union, Telecommunication Standardization Sector; "Proposed New Recommendation of ONT/NT Management and Control Interface for G.983 ATM–PON"; dated Aug. 12, 1998; pp. 1–19.

The Institute of Electronics, Information and Communication Engineers;Proceedings of the 1997 IEICE General Conference; "A Study on Number of Connections at UNI of the ATM–PDS System"; dated Mar. 24, 1997; p. 437.

The Institute of Electronics, Information and Communication Engineers; Technical Report of IECE; 600Mbit/s/ 150Mbit/s Asymmetric ATM–PDS Transmission Equipment for ATM Video Services and ISDN, dated Jun. 23, 1997; pp. 13–18.

Japanese Search Report dated Feb. 23, 1999.

The Institute of Electronics, Information and Communication Engineers; Technical Report of IEICE; "A Study of the Access Method for Bursty Traffic on ATM–PON System"; dated Jun. 23, 1997; pp. 7–12.

*Primary Examiner*—Dang Ton
*Attorney, Agent, or Firm*—McGinn & Gibb, P.C.

[57] ABSTRACT

A band setting apparatus includes an input unit, an ideal band table group, a band setting table, an ideal band setting calculation setting section, and an assignment processing section. The input unit inputs remote device numbers of a plurality of remote devices, combinations of the numbers of assigned cells in band management frames and offset values of each cell assignment, and a magnification value. The ideal band table group includes a plurality of ideal band tables corresponding to the remote devices, on which cells are arranged on the basis of a relationship between the remote devices and cell sending numbers. On the band setting table, remote device numbers having cell assignment are sequentially arranged. The ideal band setting calculation processing section obtains cell sending numbers on the basis of a temporary ideal cell interval and offset value obtained from input data to the input unit and sequentially arranges cells on the ideal band table in accordance with the obtained cell sending numbers to generate the ideal band table. The assignment processing section sequentially and continuously arranges remote device numbers with cell assignment on the band setting table in a predetermined order with reference to the ideal band table group.

20 Claims, 8 Drawing Sheets

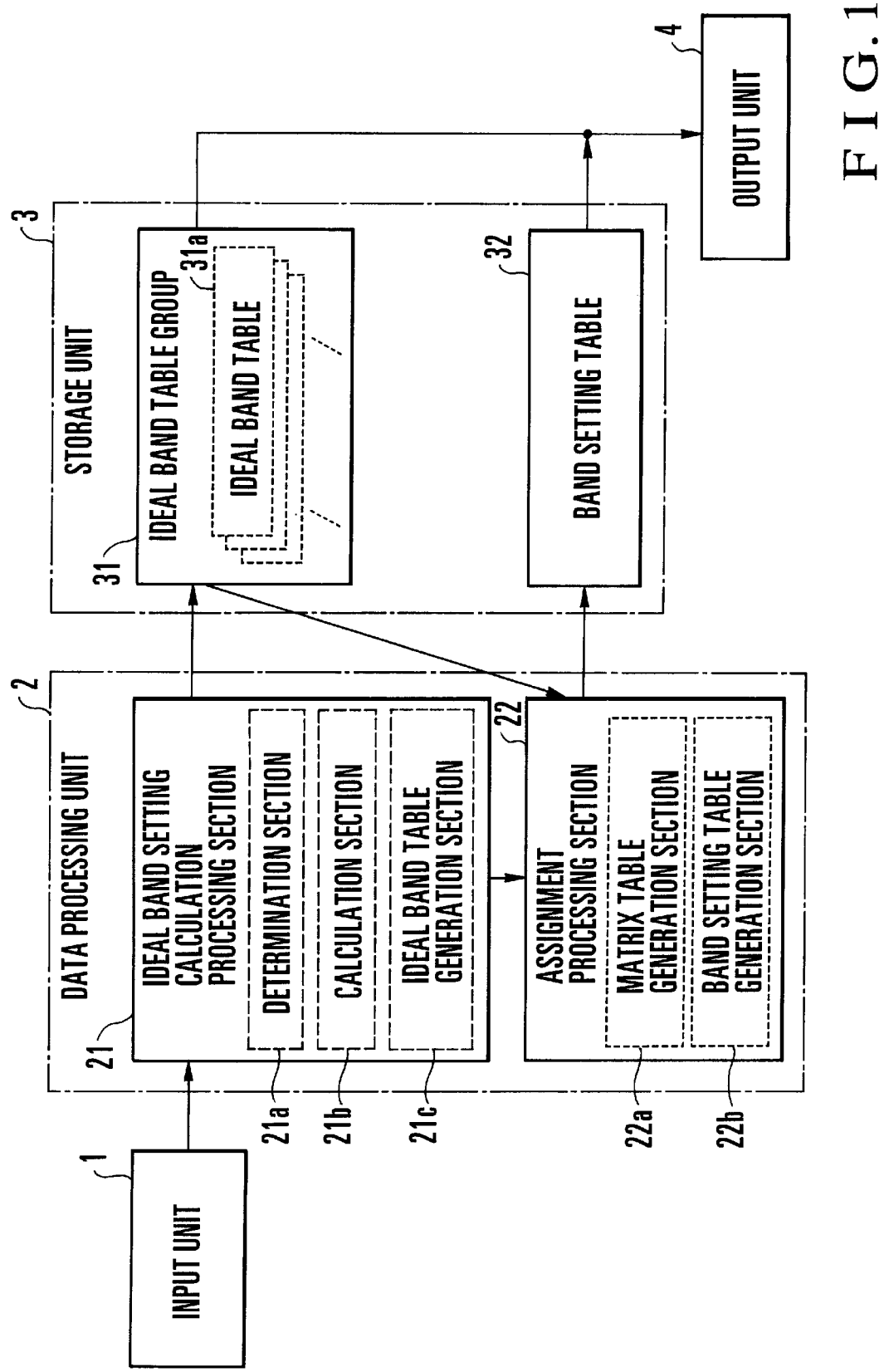
F I G. 1

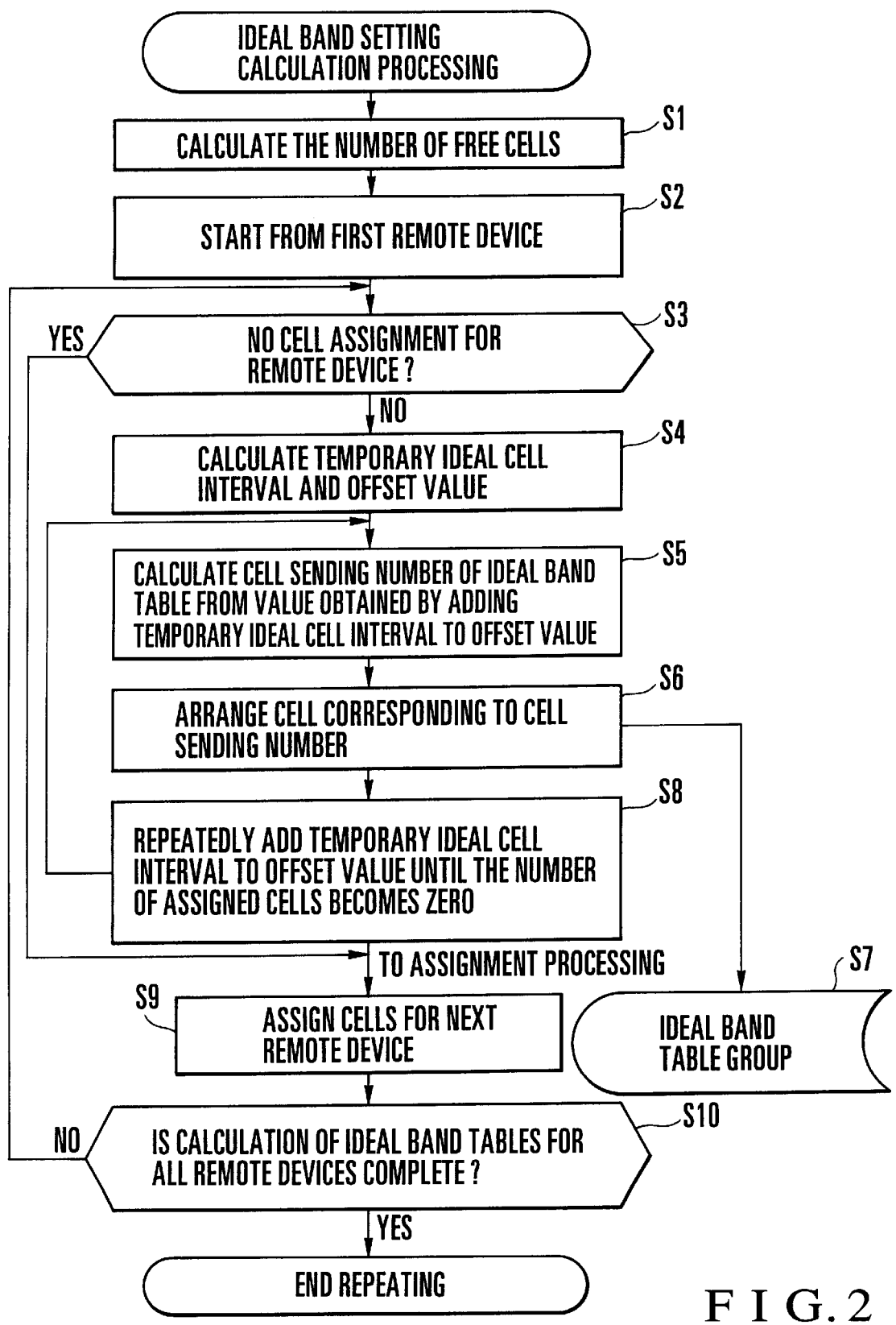
F I G. 2

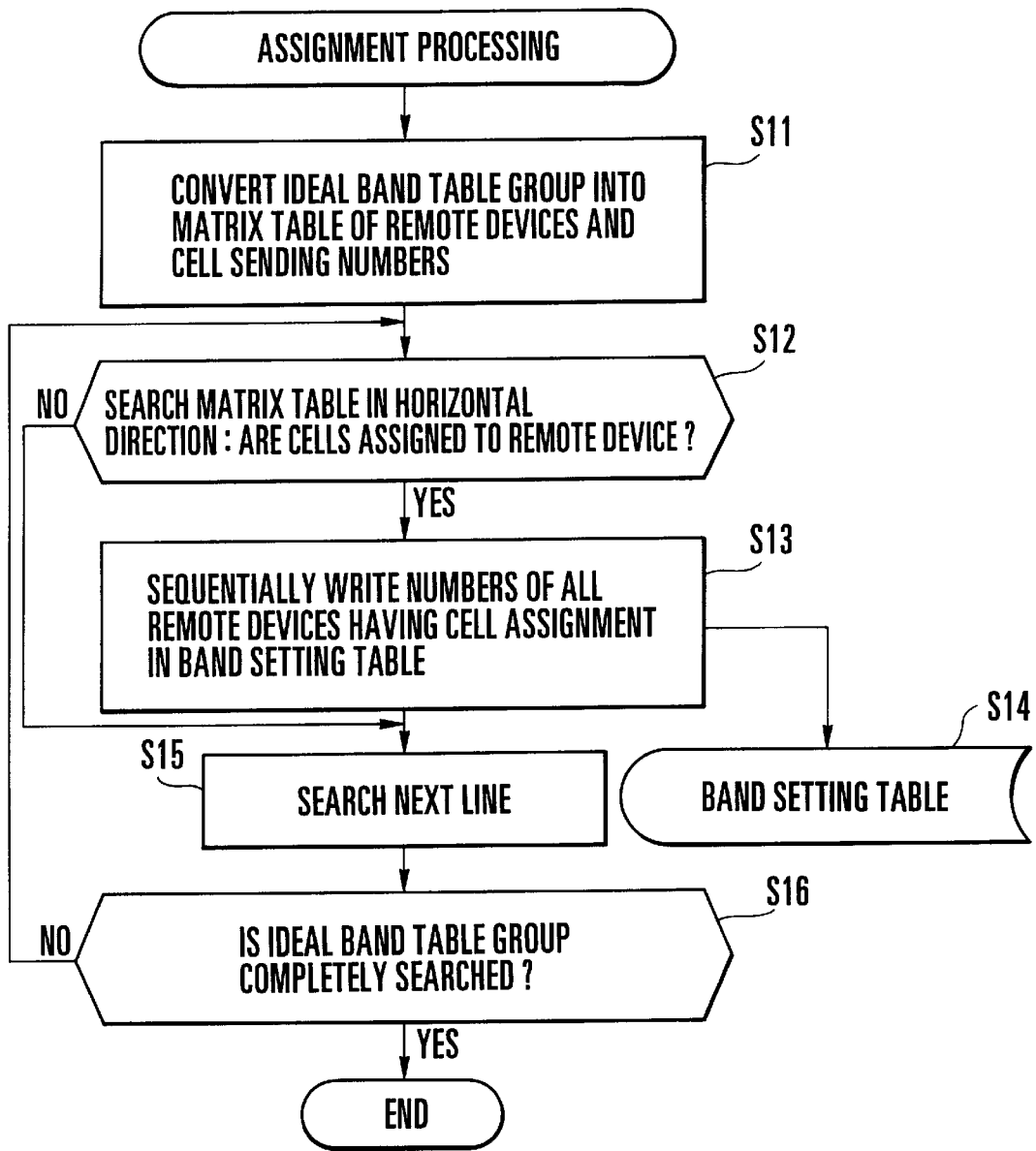
F I G. 3

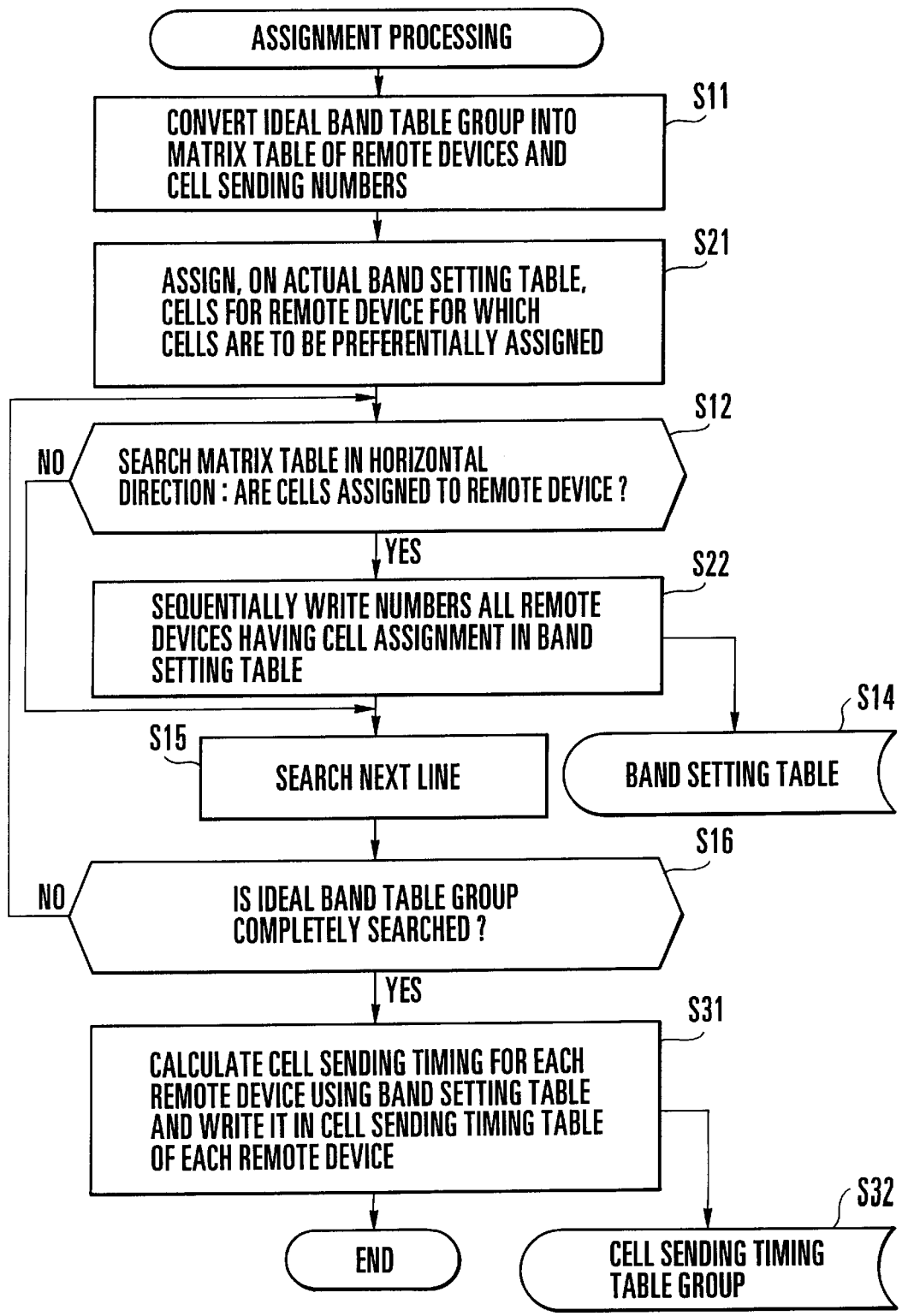
F I G. 5

BAND SETTING APPARATUS FOR SUPPRESSING CELL DELAY VARIATION

BACKGROUND OF THE INVENTION

The present invention relates to a band setting apparatus for suppressing cell delay variations in a transmission apparatus for performing TDMA (Time Division Multiple Access) communication on the cell base, in which a station device and a plurality of remote devices are star-connected, and band setting management for the remote devices is performed by the station device.

Conventionally, a transmission apparatus for performing TDMA communication on the cell base has been provided, in which a plurality of remote devices are star-connected to a station device, and band setting management for the remote devices is performed by the station device. In this transmission apparatus, the service quality to be provided to the remote devices is guaranteed by suppressing cell delay variations. In addition, to cope with a case in which different bands are assigned to the remove devices depending on the provided service, the number of cells in units of band management frames for the first remote device is uniformly set in a band setting table on which the cells are actually assigned, and the number of cells in units of band management frames for the next remote device is uniformly set in the band setting table on which the cells are actually assigned. This processing is repeated, and if a setting position overlaps the previous setting position, the setting position is shifted backward to set a new band.

In "Apportionment of Upstream Bandwidth for ATM-PDS System", Proceedings of the 1996 IEICE Communication Society Conference, B838, 1996, a method of obtaining an ideal cell sending timing signal by using a counter or the like to weight a cell for a remote device with a sending delay has been proposed because when the cell assignment positions overlap, the cell variation becomes large.

In the transmission apparatus for performing TDMA communication on the cell base, in which a plurality of remote devices are star-connected to a station device, and band setting management for the remote devices is performed by the station device, one of the necessary conditions for guaranteeing the quality of services to be provided to the remote devices is to suppress cell delay variations. In some cases, different bands are assigned to the remove devices depending on the provided service (for example, a band in the range of 1 to N cells per band setting management frame is arbitrarily assigned to each remote device). For this reason, a band setting algorithm which allows the station device to automatically execute optimum band setting must be prepared.

In the conventional transmission apparatus, cell delay variations in band setting for the first remote device pose no problem. However, in a remote device for which band setting is performed later, the cell delay variations become larger, so the service quality cannot be guaranteed. In the method of calculating the cell sending timing by weighting delayed cells, the cells are not sent unless they are weighted, so the cell delay variations may become large. This method is unsuitable to manage the service quality in units of remote devices because the cell sending timing is not output in units of remove devices.

SUMMARY OF THE INVENTION

It is an object of the present invention to provide a band setting apparatus capable of realizing band setting while suppressing cell delay variations even when different numbers of cells are assigned to remote devices.

It is another object of the present invention to provide a band setting apparatus for realizing band setting coping with priority setting or permanent cell arrangement to improve the service quality of each remote device.

In order to achieve the above objects, according to the present invention, there is provided a band setting apparatus comprising input means for inputting remote device numbers of a plurality of remote devices, combinations of the numbers of assigned cells in band management frames and offset values of each cell assignment, and a magnification value, an ideal band table group comprising a plurality of ideal band tables corresponding to the remote devices, on which cells are arranged on the basis of a relationship between the remote devices and cell sending numbers, a band setting table on which remote device numbers having cell assignment are sequentially arranged, ideal band setting calculation processing means for obtaining cell sending numbers on the basis of a temporary ideal cell interval and offset value obtained from input data to the input means and sequentially arranging cells on the ideal band table in accordance with the obtained cell sending numbers to generate the ideal band table, and assignment processing means for sequentially and continuously arranging remote device numbers with cell assignment on the band setting table in a predetermined order with reference to the ideal band table group.

BRIEF DESCRIPTION OF THE DRAWINGS

FIG. 1 is a block diagram of a band setting apparatus according to the first embodiment of the present invention;

FIG. 2 is a flow chart showing the ideal band setting calculation processing procedure of the band setting apparatus shown in FIG. 1;

FIG. 3 is a flow chart showing the assignment processing procedure of the band setting apparatus shown in FIG. 1;

FIG. 5 is a flow chart showing the assignment processing procedure of a band setting apparatus according to the third embodiment of the present invention;

DESCRIPTION OF THE PREFERRED EMBODIMENTS

Figure 4:
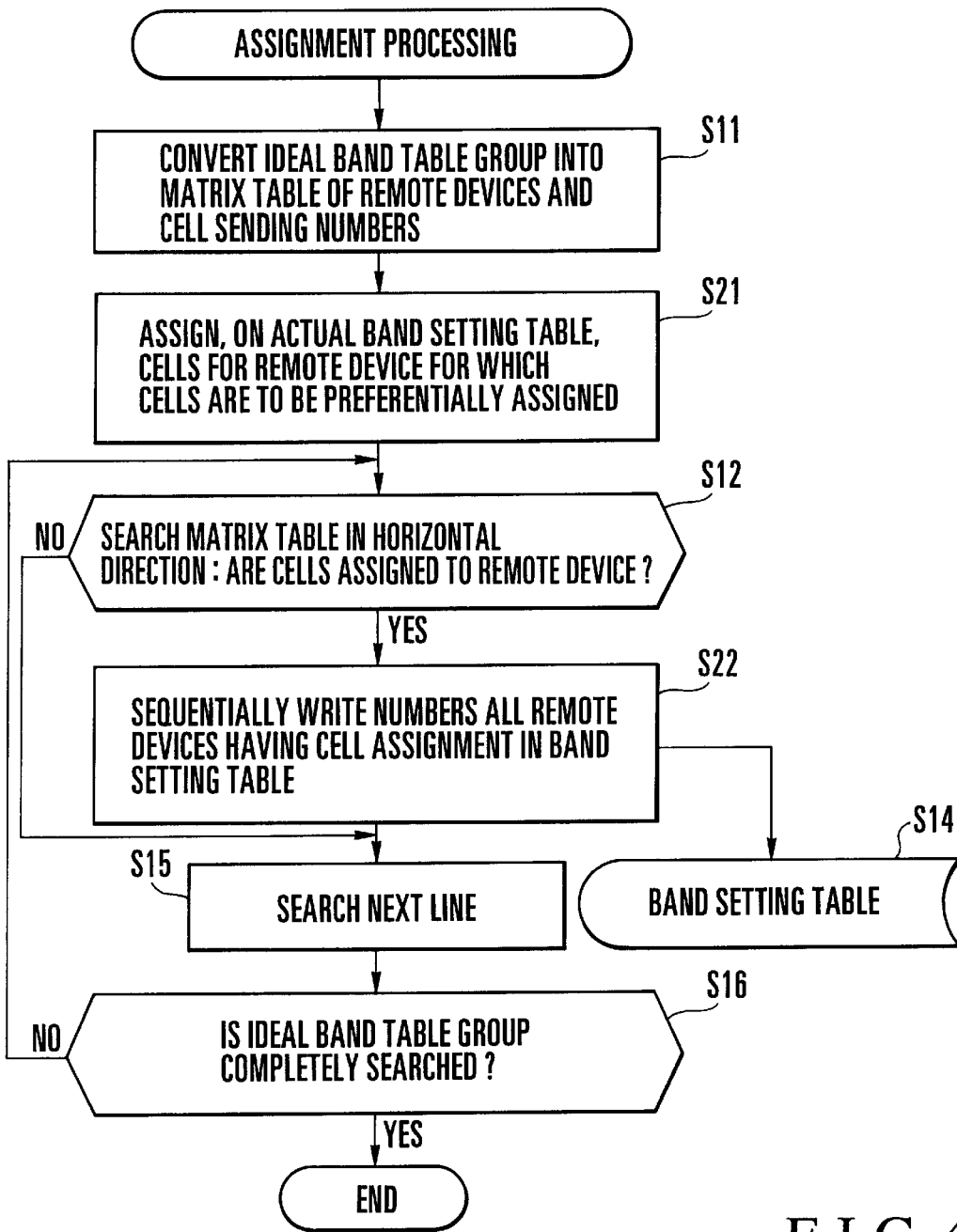
FIG. 4 is a flow chart showing the assignment processing procedure of a band setting apparatus according to the second embodiment of the present invention.

The present invention will be described below in detail with reference to the accompanying drawings.

FIG. 1 shows a band setting apparatus according to the first embodiment of the present invention. Referring to FIG. 1, reference numeral 1 denotes an input unit such as a keyboard for inputting data; 2, a data processing unit for processing the data input to the input unit 1; 3, a storage unit for storing various data; and 4, an output unit such as an external processing unit. The data processing unit 2 has an ideal band setting calculation processing section 21 and an assignment processing section 22. The storage unit 3 comprises an ideal band table group 31 having a plurality of ideal band tables 31a and a band setting table 32.

The ideal band setting calculation processing section 21 has a determination section 21a for determining the presence/absence of cell assignment to a remote device, a calculation section 21b for obtaining a cell sending number on the basis of the data input to the input unit 1, and an ideal band table generation section 21c for generating the ideal band table group 31 on the basis of the cell sending number and remote device number.

The assignment processing section 22 has a matrix table generation section 22a for generating a matrix table with reference to the ideal band table group 31, and a band setting table generation section 22b for generating the band setting table 32 on the basis of the matrix table.

The input unit 1 inputs the remote device numbers of a plurality of remote devices, combinations of numbers of assigned cells in band management frames and offset values of cell assignment, and a magnification value.

In the ideal band setting calculation processing section 21, the determination section 21a calculates the number of free cells which are not assigned in a band management frame on the basis of the combination of an input remote device number and the number of assigned cells in the band management frame to determine the presence/absence of cell assignment for the remote device.

If it is determined that cell assignment is present, the calculation section 21b divides the band management frame by the number of assigned cells and then multiplies the resultant value by the input magnification value to calculate a temporary ideal cell interval. The ideal band table generation section 21c sequentially arranges cells in the ideal band table 31a of the storage unit 3 using, as a cell sending number, the value of an integer portion of the value obtained by dividing the temporary ideal interval and offset value (for the first time, only the offset value) by the input magnification value. This processing is executed until the number of assigned cells becomes zero for all the remaining remote devices, thereby storing the matrix tables as the ideal band table group 31.

In the assignment processing section 22, the matrix table generation section 22a extracts the cell sending numbers of cells assigned in the ideal band table group 31 and arranges them in ascending order. This processing is repeated for all remote devices managed on the ideal band table 31a, and the extraction results are arranged in the horizontal direction in units of cell sending numbers, thereby generating a matrix table. The band setting table generation section 22b executes assignment processing of searching the presence/absence of cell assignment in ascending order with reference to this table and sequentially and continuously assigning remote device numbers with cell assignment on the band setting table. This processing is executed for all tables.

The operation of the band setting apparatus shown in FIG. 1 will be described next with reference to the flow charts shown in FIGS. 2 and 3.

The remote device numbers of the remote devices, the combinations of numbers of assigned cells in band management frames and offset values of cell assignment, and the magnification value, which are input to the input unit 1, are supplied to the ideal band setting calculation processing section 21 of the data processing unit 2. The offset value of each cell assignment is used to shift the first cell sending position when the ideal band setting calculation processing section 21 calculates the ideal band table group 31 of each remote device. The magnification value is used to decrease division errors in calculating the ideal band table group 31 by multiplying the magnification value.

Referring to FIG. 2, the determination section 21a of the ideal band setting calculation processing section 21 calculates the number of free cells which are not assigned in the band management frame, on the basis of the combination of the remote device number of each remote device and the number of assigned cells in the band management frame (step S1).

Subsequently, the calculated number of free cells is regarded as one of the remote device numbers, and processing is started from the first remote device (step S2). The presence/absence of cell assignment for the remote device is determined (step S3). If no cell assignment is present, cells are assigned to the next remote device (step S9).

If cell assignment is present, the calculation section 21b divides the band management frame by the number of assigned cells and then multiplied by the magnification value input from the input unit 1, thereby calculating a temporary ideal cell interval. In addition, a value ½ the temporary ideal cell interval is calculated as the offset value (step S4). The offset value may be input from the input unit 1.

The value of the integer portion of the value obtained by dividing the offset value by the magnification value is calculated as a cell sending number of the ideal band table 31a (step S5). The ideal band table generation section 21c arranges a cell on the ideal band table 31a (step S6). With this processing, the first cell is arranged on the ideal band table group 31 (step S7).

The calculation section 21b and ideal band table generation section 21c repeat this processing until the number of assigned cells for the remote device becomes zero. More specifically, an operation of adding the temporary ideal cell interval to a value used to sequentially arrange a cell from the first number is repeated (step S8). The flow returns to step S5 to divide the sum value (offset value+temporary ideal cell interval) by the magnification value. The value of the integer portion is used as a cell sending number in the ideal band table 31a, and a cell is arranged on the ideal band table. Subsequently, in step S6, the matrix tables are stored in the storage unit 3 as the ideal band table group 31.

When the number of cells assigned for the remote device becomes zero, repetition is ended, and cells are assigned for the next remote device (step S9). When calculation of the ideal band tables 31a of cell assignment for all remote devices, including free cells, is ended (step S10), the flow advances to assignment processing by the assignment processing section 22.

Figure 7:
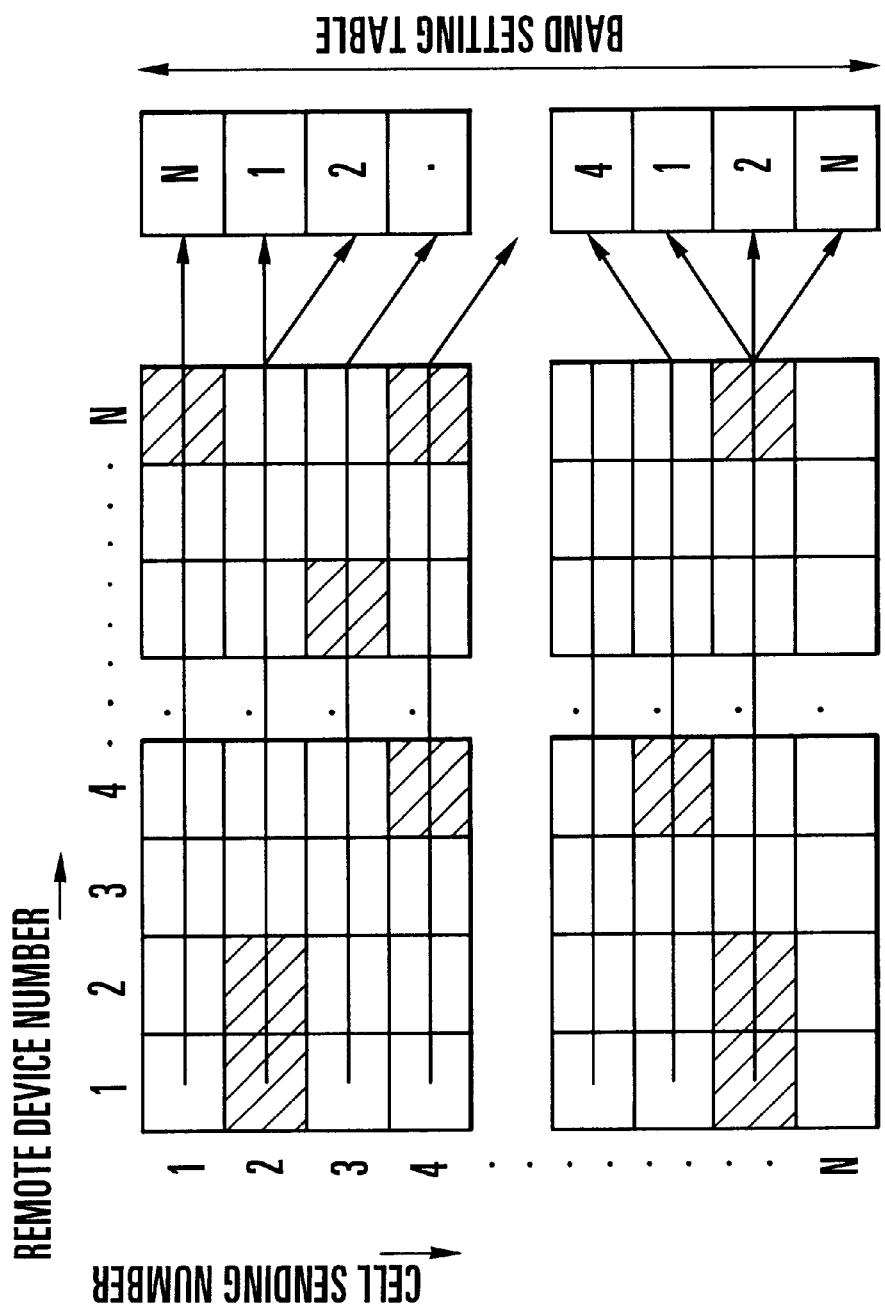
FIG. 7 is a view for explaining a matrix table shown in FIG. 1.

Referring to FIG. 3, the matrix table generation section 22a of the assignment processing section 22 extracts the cell sending numbers of cells assigned in the ideal band table group 31 of the storage unit 3 and arranges the cell sending numbers in ascending order. This processing is repeated for all remote devices managed on the ideal band table 31a, and the matrix table generation section 22a arranges the extraction results in the horizontal direction in units of cell sending numbers, thereby generating the matrix table as shown in FIG. 7 (step S11). This table is searched for the presence/absence of cell assignment in ascending order of the cell sending numbers (step S12). Each hatched portion in the matrix table of FIG. 7 indicates that a cell is assigned to the cell sending number of the remote device. If no cells are assigned to the remote device, the flow advances to step S15.

If cells are assigned, the band setting table generation section 22b continuously arranges the remote device numbers on the band setting table 32 in ascending order of cell sending numbers (step S13) to generate the band setting table 32 (step S14). When searching of a cell sending number is ended, the next cell sending number in the matrix table generated in step S11 is searched for (step S15). When the matrix table is completely searched (step S16), the band setting table 32 is stored in the storage unit 3 and output to the output unit 4 together with the ideal band table group 31. If searching is not ended, processing from step S12 is repeated.

An example of band setting will be described next in detail. For example, remote device numbers "1" to "N−1", combinations of the number i of assigned cells in the band management frame of each remote device and an offset value, and a magnification value X are supplied from the input unit 1 to the ideal band setting calculation processing section 21 of the data processing unit 2.

The determination section 21a of the ideal band setting calculation processing section 21 calculates the total number of assigned cells in the band management frame, calculates the number of free cells in a band management frame M (M−the total number i of assigned cells of remote devices numbers "1" to "N−1"), and assigns it as the remote device number "N". The presence/absence of cell assignment for the remote devices is determined starting from the first remote device number "1". If cell assignment is not present, the next remote device number is processed.

When cell assignment is present, the calculation section 21b calculates a value obtained by multiplying M/il by the magnification value X (integer value larger than M and easy to calculate) as the temporary ideal cell interval. Subsequently, using an offset value α as an input value from the input unit 1, $$\{\alpha+(M \cdot X/il)\}/X$$

is calculated. The ideal band table generation section 21c arranges the integer value portion of the calculation result at a corresponding portion of the cell sending number of the band management frame managed on the cell base. After this, $$M \cdot X/il$$

is sequentially added to $$\alpha+(M \cdot X/il)$$

The resultant value is divided by the magnification value X, and the integer value portion is arranged at a corresponding portion of the cell sending number of the band management frame.

By repeating this processing M times, the ideal band table 31a for the remote device number "1" is calculated. This processing is executed for the remaining remote devices, and the matrix tables are stored in the storage unit 3 as the ideal band table group 31.

The matrix table generation section 22a of the assignment processing section 22 converts the ideal band table group 31 in the storage unit 3 into a matrix table. More specifically, the cell sending numbers with assigned cells are extracted and arranged on the ideal band table group 31 show in FIG. 7 in ascending order. This processing is repeated for all remote devices managed on the ideal band table 31a. The extraction results are arranged in the horizontal direction in units of cell sending numbers to generate a matrix table.

The converted table is searched for the presence/absence of cell assignment in ascending order of the cell sending numbers in a direction indicated by an arrow in FIG. 7. When hatched portions indicating that cell assignment for the remote device numbers is present are searched for, the band setting table generation section 22b continuously arranges the remote device numbers with cell assignment in ascending order of the cell sending numbers in the band setting table.

When the above-described processing is performed for all cell sending numbers, the total number of cells assigned in the band management frame of each remote device does not exceeds the cell sending number of the band management frame managed on the cell base, so the band setting table 32 in which the remote device numbers (including free cells) are continuously arranged is generated. The ideal band table group 31 and band setting table 32 stored in the storage unit 3 are output to the output unit 4, and the cell sending position for each remote device is determined.

Figure 8:
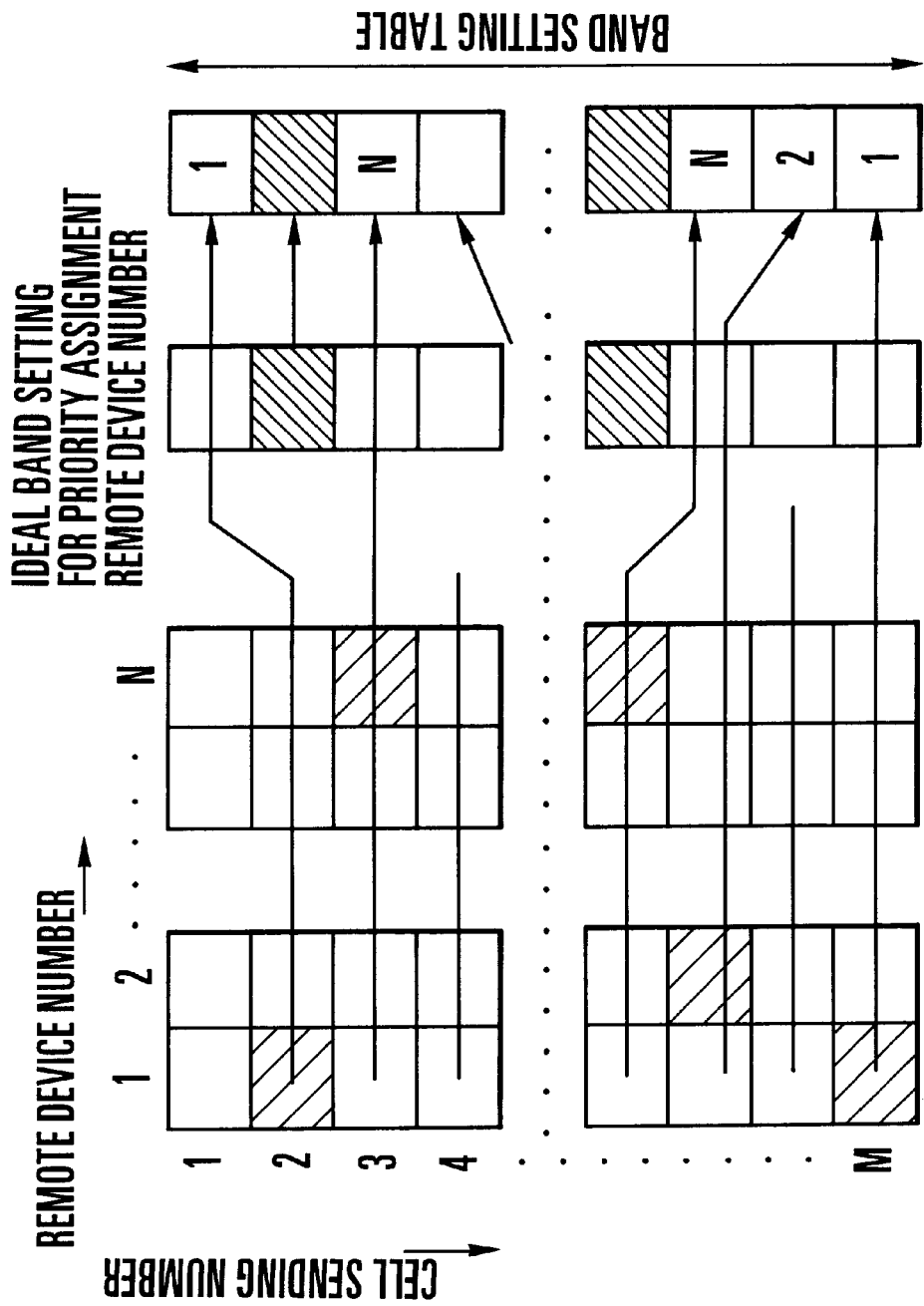
FIG. 8 is a view for explaining another matrix table.

The second embodiment of the present invention will be described next with reference to FIGS. 4 and 8. The block diagram of the apparatus of this embodiment is the same as that of the first embodiment shown in FIG. 1, and a detailed description thereof will be omitted. In this embodiment, after processing shown in FIG. 2, assignment processing shown in FIG. 4 is performed instead of assignment processing shown in FIG. 3.

Referring to FIG. 4, in step S21 following the same step S11 as in FIG. 3, cells for a remote device for which the cells are to be preferentially assigned are assigned in an actual band setting table 32 first, thereby arranging cells for the remote device for which the cells are to be preferentially assigned. Subsequently, the presence/absence of cell assignment is searched for in ascending order of cell sending numbers (step S12). When cell assignment is present, a solid portion of ideal band setting of the priority assignment remote device number shown in FIG. 8 is arranged on the band setting table first. Simultaneously, cells for the remaining remote devices are arranged at portions other than the cell arrangement portion for the priority assignment remote device number.

The third embodiment of the present invention will be described next with reference to FIG. 5. In this embodiment, assignment processing shown in FIG. 5 is performed after processing shown in FIG. 2, and steps S31 and S32 are added to the processing procedure shown in FIG. 4. In this embodiment, after searching in step S16 is ended, a cell sending timing table group 31 for each remote device is generated in units of band management frames using a band setting table 32, thereby clarifying the cell position.

Figure 6:
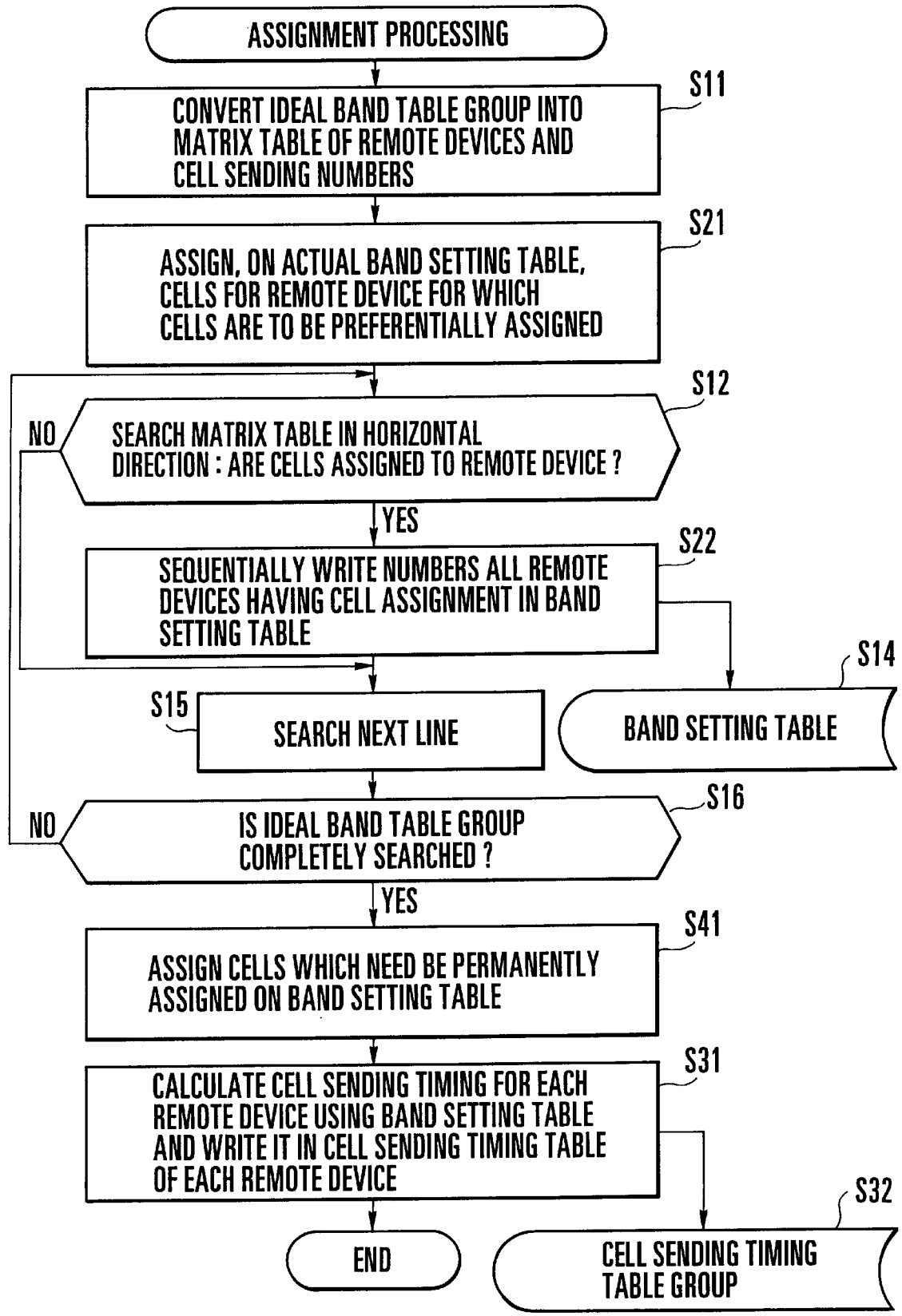
FIG. 6 is a flow chart showing the assignment processing procedure of a band setting apparatus according to the fourth embodiment of the present invention.

FIG. 6 shows the fourth embodiment of the present invention. In this embodiment, step S41 is added next to step S16 in the processing procedure shown in FIG. 5. In step S41, a cell necessary to permanently assign, e.g., a cell to be sent for distance measurement is inserted into a band setting table 32. After this, using a band setting table 21, the cell sending timing for each remote device is calculated and written in a cell sending timing table (not shown) of the remote device (step S31).

As has been described above, according to the present invention, cell assignment to the band management frame of each remote device can be almost uniformly performed, so cell delay variations in each remote device can be minimized. With this arrangement, the service quality of each remote device can be guaranteed.

In the band setting table, the ideal band table of a remote device for which cells are to be preferentially assigned is assigned first, so the service qualities of the remote devices can be further uniformed.

In addition, since the cell sending timing for each remote device is calculated using the band setting table and written in the cell sending timing table, the cell position can be clarified in units of band management frames.

Furthermore, a cell which must be permanently assigned is assigned on the band setting table. This arrangement is effective to permanently assign a cell on the band setting table to arrange a cell to be sent for distance measurement.

What is claimed is:

1. A band setting apparatus comprising:

input means for inputting remote device numbers of a plurality of remote devices, combinations of the numbers of assigned cells in band management frames and offset values of each cell assignment, and a magnification value;

an ideal band table group comprising a plurality of ideal band tables corresponding to the remote devices, on which cells are arranged on the basis of a relationship between the remote devices and cell sending numbers;

a band setting table on which remote device numbers having a cell assignment are sequentially arranged;

ideal band setting calculation processing means for obtaining cell sending numbers on the basis of a temporary ideal cell interval and an offset value obtained from input data to said input means and sequentially arranging cells on an ideal band table in accordance with the obtained cell sending numbers to generate the ideal band table; and assignment processing means for sequentially and continuously arranging remote device numbers with a cell assignment on the band setting table in a predetermined order with reference to the ideal band table group.

2. An apparatus according to claim 1, wherein said ideal band setting calculation processing means comprises:

calculation means for dividing a band management frame by a number of assigned cells and then multiplying a resultant value by a magnification value to calculate at least a temporary ideal cell interval and obtaining, as the cell sending number, a value of an integer portion of a value obtained by dividing the calculated temporary ideal cell interval and offset value by the magnification value, and ideal band table generation means for sequentially arranging cells on the ideal band table in accordance with the obtained cell sending numbers to generate the ideal band table group, and wherein said calculation means and said ideal band table generation means execute calculation processing and table generation processing until the number of assigned cells becomes zero for all of said plurality of remote devices.

3. An apparatus according to claim 1, further comprising determination means for calculating a number of free cells which are not assigned in a band management frame on the basis of a combination of a remote device number and the number of assigned cells in the band management frame to determine the presence or absence of a cell assignment for the remote device.

4. An apparatus according to claim 1, wherein said assignment processing means comprises matrix table generation means for sequentially extracting the cell sending numbers of cells assigned on the ideal band table group in ascending order of remote device numbers and arranging the cell sending numbers in ascending order to generate a matrix table on which extraction results are arranged in a horizontal direction in units of cell sending numbers, and a band setting table generation means for searching for the presence or absence of a cell assignment in ascending order with reference to the matrix table to sequentially and continuously arrange remote device numbers with said cell assignment on the band setting table.

5. An apparatus according to claim 1, wherein said assignment processing means preferentially performs assignment processing of the ideal band table corresponding to a remote device for which cells are to be preferentially assigned on the band setting table.

6. An apparatus according to claim 1, wherein said assignment processing means calculates a cell sending timing for each remote device using the band setting table and writes the cell sending timing in a cell sending timing table.

7. An apparatus according to claim 1, wherein said assignment processing means assigns cells which need to be permanently assigned on the band setting table.

8. A band setting apparatus comprising:

an input device for inputting remote device numbers of a plurality of remote devices, combinations of the numbers of assigned cells in band management frames and offset values of each cell assignment, and a magnification value;

an ideal band table group comprising a plurality of ideal band tables corresponding to the remote devices, on which cells are arranged on the basis of a relationship between the remote devices and cell sending numbers;

a band setting table on which remote device numbers having a cell assignment are sequentially arranged; and an ideal band setting calculation processor for obtaining cell sending numbers on the basis of a temporary ideal cell interval and an offset value obtained from input data to said input device and sequentially arranging cells on an ideal band table in accordance with the obtained cell sending numbers to generate the ideal band table.

9. An apparatus as claimed in claim 8, further comprising:

an assignment processor for sequentially and continuously arranging remote device numbers with a cell assignment on the band setting table in a predetermined order with reference to the ideal band table group.

10. An apparatus according to claim 8, wherein said ideal band setting calculation processor comprises:

a calculation device for dividing a band management frame by a number of assigned cells and then multiplying a resultant value by a magnification value to calculate at least a temporary ideal cell interval and obtaining, as the cell sending number, a value of an integer portion of a value obtained by dividing the calculated temporary ideal cell interval and offset value by the magnification value, and an ideal band table generator for sequentially arranging cells on the ideal band table in accordance with the obtained cell sending numbers to generate the ideal band table group, and wherein said calculation device and said ideal band table generator execute calculation processing and table generation processing until the number of assigned cells becomes zero for all of said plurality of remote devices.

11. An apparatus according to claim 10, further comprising a calculator device for calculating a number of free cells which are not assigned in a band management frame on the basis of a combination of a remote device number and the number of assigned cells in the band management frame to determine the presence or absence of a cell assignment for the remote device.

12. An apparatus according to claim 9, wherein said assignment processor comprises a matrix table generator for sequentially extracting the cell sending numbers of cells assigned on the ideal band table group in ascending order of remote device numbers and arranging the cell sending numbers in ascending order to generate a matrix table on which extraction results are arranged in a horizontal direction in units of cell sending numbers, and a band setting table generator for searching for the presence or absence of a cell assignment in ascending order with reference to the matrix table to sequentially and continuously arrange remote device numbers with said cell assignment on the band setting table.

13. An apparatus according to claim 9, wherein said assignment processor preferentially performs assignment processing of the ideal tables corresponding to a band table corresponding to a remote device for which cells are to be preferentially assigned on the band setting table.

14. An apparatus according to claim 9, wherein said assignment processor calculates a cell sending timing for each remote device using the band setting table and writes the cell sending timing in a cell sending timing table.

15. An apparatus according to claim 9, wherein said assignment processor assigns cells permanently on the band setting table.

16. A band setting apparatus comprising:

an ideal band setting calculation processor for outputting cell sending numbers on a basis of a temporary ideal cell interval and an offset value obtained from input data and sequentially arranging cells on one of a plurality of ideal band tables in accordance with the obtained cell sending numbers.

17. The band setting apparatus according to claim 16, further comprising;

an input device, coupled to the ideal band setting calculation processor, for inputting remote device numbers of a plurality of remote devices, combinations of each number of assigned cells in band management frames and offset values of each cell assignment, and a magnification value.

18. The band setting apparatus as claimed in claim 16, further comprising:

an ideal band table group, wherein is included a plurality of ideal band tables corresponding to the plurality of remote devices, on which cells are arranged on the basis of a relationship between the remote devices and cell sending numbers, and a band setting table on which remote device numbers having cell assignment are sequentially arranged.

19. The band setting apparatus as claimed in claim 18, wherein an assignment processor for sequentially and continuously arranging remote device numbers with a cell assignment on the band setting table in a predetermined order with reference to the ideal band table group.

20. The band setting apparatus as claimed in claim 19, wherein said assignment processor comprises:

a matrix table generator, wherein the cell sending number of cells assigned on the ideal band table group in ascending order of remote device numbers are extracted sequentially and arranged in ascending order on a matrix table in a horizontal direction in units of cell sending numbers; and a band setting table generator, wherein a search for the presence or absence of cell assignment in ascending order with reference to the matrix table is performed to sequentially and continuously arrange the remote device numbers with cell assignment on the band setting table, and wherein said assignment processor preferentially performs assignment processing based upon a calculation of cell sending time for each remote device using said band setting table.

\* \* \* \* \*